United States Patent [19]
Nenov

[11] Patent Number: 5,255,348
[45] Date of Patent: Oct. 19, 1993

[54] NEURAL NETWORK FOR LEARNING, RECOGNITION AND RECALL OF PATTERN SEQUENCES

[76] Inventor: Valeriy I. Nenov, 848 18th St., Apt. 5, Santa Monica, Calif. 90404

[21] Appl. No.: 715,573

[22] Filed: Jun. 14, 1991

[51] Int. Cl.$^5$ ............................................. G06F 15/18
[52] U.S. Cl. ........................................ 395/24; 395/21
[58] Field of Search .............................. 395/21, 22, 24

[56] References Cited

U.S. PATENT DOCUMENTS 4,914,708  4/1990  Carpenter et al. ................... 395/21
4,979,124 12/1990  Sachse et al. ........................ 395/22

Primary Examiner—Michael R. Fleming
Assistant Examiner—Robert W. Downs
Attorney, Agent, or Firm—Harness, Dickey & Pierce

[57] ABSTRACT

A sequence processor for rapidly learning, recognizing and recalling temporal sequences. The processor, called the Katamic system, is a biologically inspired artificial neural network based on a model of the functions of the cerebellum in the brain. The Katamic system utilizes three basic types of neuron-like elements with different functional characteristics called predictrons, recognitrons and bi-stable switches. The Katamic System is clock operated, processing input sequences pattern by pattern to produce an output pattern which is a prediction of the next pattern in the input sequence. The Katamic System learns rapidly, has a large memory capacity, exhibits sequence completion and sequence recognition capability, and is fault and noise tolerant. The system's modular construction permits straightforward scaleability.

19 Claims, 5 Drawing Sheets

NEURAL NETWORK FOR LEARNING, RECOGNITION AND RECALL OF PATTERN SEQUENCES

BACKGROUND OF THE INVENTION

Technical Field

This invention relates to systems and methods for processing temporal data, and in particular to a neural network for processing temporal sequences of patterns.

Discussion

Sequence processing involves performing useful operations on data patterns which vary over time. Sequence processing is important in many applications, such as natural language processing, robotics, image processing, high level automation problems such as scheduling and planning, and in many other areas. Sequence processing is often necessary because in the real world, data is normally received in sequences one piece at a time, rather than being presented all at once. Sequence processing systems are used to process, store and recall these sequences of data.

Artificial neural networks, also called connectionist architectures, have shown promise in their ability to "learn" sequential patterns. This is a significant advance over conventional symbolic sequential computing approaches which must rely on explicit algorithms and software to process sequential data.

Three distinct tasks are usually involved in sequence processing. The first is sequence recognition. In this task, it is desired to produce a particular output pattern in response to a particular input sequence. This would be useful, for example, in speech recognition applications where the output might indicate a word just spoken. The second task is sequence reproduction. This requires the generation of a complete signal when only part of the sequence is available. This task is involved, for instance, in the prediction of the future course of a time series given past examples The third kind of function is temporal association. In this function, a specific output sequence must be produced in response to a given input sequence. Sequence recognition and sequence reproduction are special cases of temporal association.

There are two main approaches to processing sequences in connectionist models. The first approach is to paralyzed time by representing it spatially. There are a number of problems with this approach First, an interface must buffer the input to the real world so that the network has all of the input available at one time. Also, it must be determined when the buffer is full and can be processed. Further, this input buffer approach assumes that all input patterns must be the same length, which is not realistic in most applications. Thus, the buffer must be made large enough to accommodate the longest possible sequence. This results in unused buffers when shorter sequences are processed. Another problem is that input vectors which are similar but displaced temporally will appear very different when represented spatially.

Another way of representing time in connectionist systems is to give the system a "sequential memory". This will permit time to be represented by the effect it has on processing rather than explicitly as in a spatial representation. Neural networks of this type for sequence processing, can be categorized into two main classes: synchronously updating networks (SUNs) and asychronously updating networks (AUNs). In SUNs, activation values on processing nodes are updated at each clock cycle. The majority of SUNs use error back-propagation as a learning mechanism although, Hebbian learning is also used. AUNs on the other hand, are characterized by the fact that the node activations are not updated synchronously. See C. L. D'Autrechy and J. A. Reggia (1989), "An Overview Of Sequence Processing By Connectionist Models". Technical Report UMIACS-TR-89-82 (SC-DR-2301), University of Maryland, College Park, Md. For a review of SUNs and AUNs.

AUNs which have symmetric weights and operate within a noise—free space cannot be used as content addressable memories for temporal patterns. One problem is that AUNs are prone to settling into a state instead of producing a new output value at the next iteration. SUNs do not have this problem but are limited in other ways. Since SUNs are clocked, meaning that the input can only arrive at fixed intervals, SUNs cannot handle a continuously varying analog input signal. AUNs, on the other hand can realize storage of temporal patterns if the synaptic weights are sufficiently non-symmetric and noise is introduced into the system. This sequential order of stored patterns in these models is a consequence of the asymmetry of synapses which provide direct projections between equilibrium states of the network. The transitions between states are noise triggered.

Both SUNs and AUNs each have particular advantages and disadvantages. SUNs are able to process longer sequences with longer embedded sub-sequences. Also, SUNs exhibit a collapsing problem and an inefficiency of association problem. AUNs have difficulty learning any arbitrary length of sequences with multiple possible successors. Also, AUNs seem to require many more nodes than SUNs to learn the same sequence. In general, AUNs cannot learn a sequence in which there is a lot of overlap between the items of the sequence. Both SUNs and AUNs have problems along different functional dimensions.

Besides SUNs and AUNS, a number of other architectures have also been developed including hybrid SUN/AUN systems. However, most previous sequence processors, whatever the category, exhibit slow learning, and for example, may require hundreds of training epochs to achieve reliable performance. Another problem with many prior sequence processors is that they exhibit limited sequence completion capability, which requires most of the sequence to be presented before the system can complete or retrieve the whole sequence. Further, many prior systems do not have controllable storage capacities. Therefore such systems cannot be easily reconfigured to store different types of sequences. Another problem is limited fault tolerance; that is, a limited ability to tolerate missing bits within patterns by substituting them during recall.

Also lacking in many prior systems, is acceptable tolerance to input noise and time warping of input sequences. Further, many prior systems are limited in their robustness of performance, since they cannot operate within a wide range of values for memory parameters. Also, scaleability is limited in many prior systems so that these systems cannot handle arbitrarily wide bit patterns or arbitrarily long sequences. Finally, many prior systems do not make an efficient use of resources.

This is because of their full connectivity which leaves may connections unused at any given time.

In view of the foregoing, it would be desirable to provide a sequence processor which can learn, recognize, and recall temporal sequences after only a few training cycles. It would also be desirable to provide such a sequence processor which has good sequence completion capability. It would additionally be desirable to have a sequence processor which has an easily controllable storage capacity. Also, it would be desirable to provide such a sequence processor which is relatively fault, noise, and time-warp tolerant. Further, it would be desirable to provide such a sequence processor which exhibits robustness of performance and straightforward scaleability. It would also be desirable to provide such a sequence processor with the above characteristics which makes an efficient use of resources and is relatively inexpensive to produce.

SUMMARY OF THE INVENTION

Pursuant to the present invention, a sequence processor is provided which can rapidly learn, recognize and recall temporal sequences. In accordance with one aspect of the present invention, the sequence processor includes a plurality of external input lines for receiving and transmitting signals representing a portion of a sequence pattern. A number of sequence prediction devices are coupled to the input lines for providing an output signal that is a prediction of a future data signal in the temporal sequence pattern. The prediction device includes a processing element which produces an output activation value based on its inputs. Also, the prediction device includes a plurality of memory modules connected to the processing element for storing and transforming the input signals, wherein the processing element activation value is a function of the transformed input signals from the memory modules. Also, a plurality of input lines are connected to each of the memory modules. A recognition device is coupled to the external input lines and also to the prediction device output for producing an output signal indicative of whether a current prediction device output is a correct or incorrect prediction of the next external input data signal. Also, a gating unit is coupled to the output of the prediction device as well as to the output of the recognition device for selectively directing either the external input along the external input line to the internal input line, or alternatively directing the prediction device output to the internal input. The selection by the gating unit is made based on the recognition device output.

In accordance with another aspect of the present invention, a method is provided for processing temporal data patterns which includes the steps of receiving and transmitting signals representing a portion of the pattern and producing an output signal in a prediction device that is a prediction of a future data signal in the temporal sequence pattern. The system stores and transforms the input signals in a plurality of memory modules contained within the prediction device. Also, the system produces an output activation value in a processing element in the prediction device that is a function of the input signal from the plurality of memory modules. The system also provides an internal input line connected to at least one of the memory modules in an associated prediction device, as well as a recognition device coupled to the external input line and also to at least one associated prediction device. The system then produces an output signal in the recognition device when a current prediction device output matches the next external input data signal. Then, a gate unit selectively directs the external input device for the prediction device output to the internal input line depending on the state of the recognition device output. In this way, when the prediction device output matches the next external data signal, the prediction device can produce the next output of the system without an additional external input.

BRIEF DESCRIPTION OF THE DRAWINGS

The various advantages of the present invention will become apparent to on skilled in the art by reading the following specification and by reference to the following drawings in which:

FIG. 4 is a diagram of a dendritic compartment of a recognitron;

DESCRIPTION OF THE PREFERRED EMBODIMENTS

The present invention is a synchronously updating (SUN) sequence processing network called a Katamic system. The Katamic system is a biologically inspired artificial neural network which utilizes three basic types of neuron-like elements with different functional characteristics. These elements are called Predictrons, Recognitrons, and Bi-Stable Switches.

The Katamic system grew out of the development of a model of the functioning of the cerebellum in the brain. The cerebellum is the structure of the brain responsible for regulation and coordination of complex voluntary muscular movement. It lies posterior to the pons and medulla oblongata and inferior to the occipital lobes of the cerebral hemispheres.

Numerous theories of cerebellar function have been proposed. Various theorists have viewed the cerebellar cortex as a perceptron-like pattern classifier; an adaptive filter; an array of adjustable pattern generators; and a random access memory. While most researchers agree that the cerebellar cortex is involved in learning and execution of complex motor programs, in general, previously proposed models have not handled explicitly the neural representation of the temporal aspects of these programs. The Katamic system, on the other hand is based on a new theory of cerebellar cortical function, in which the cerebellar cortex is viewed as a sequential associative memory which is involved in concurrent learning, recognition, and recall of sequences of action potentials (spike trains) reaching the cerebellum along mossy fibers.

Thus, with certain simplifications and assumptions, the Katamic system of the present invention can be thought of as a biologically plausible architecture of the cerebellum. Of course, as the following discussion will make evident, the Katamic system as disclosed herein is an artificial neural network, and can readily be constructed using conventional electronic circuitry with well known methods of signal storage, interconnection and control.

Figure 1:
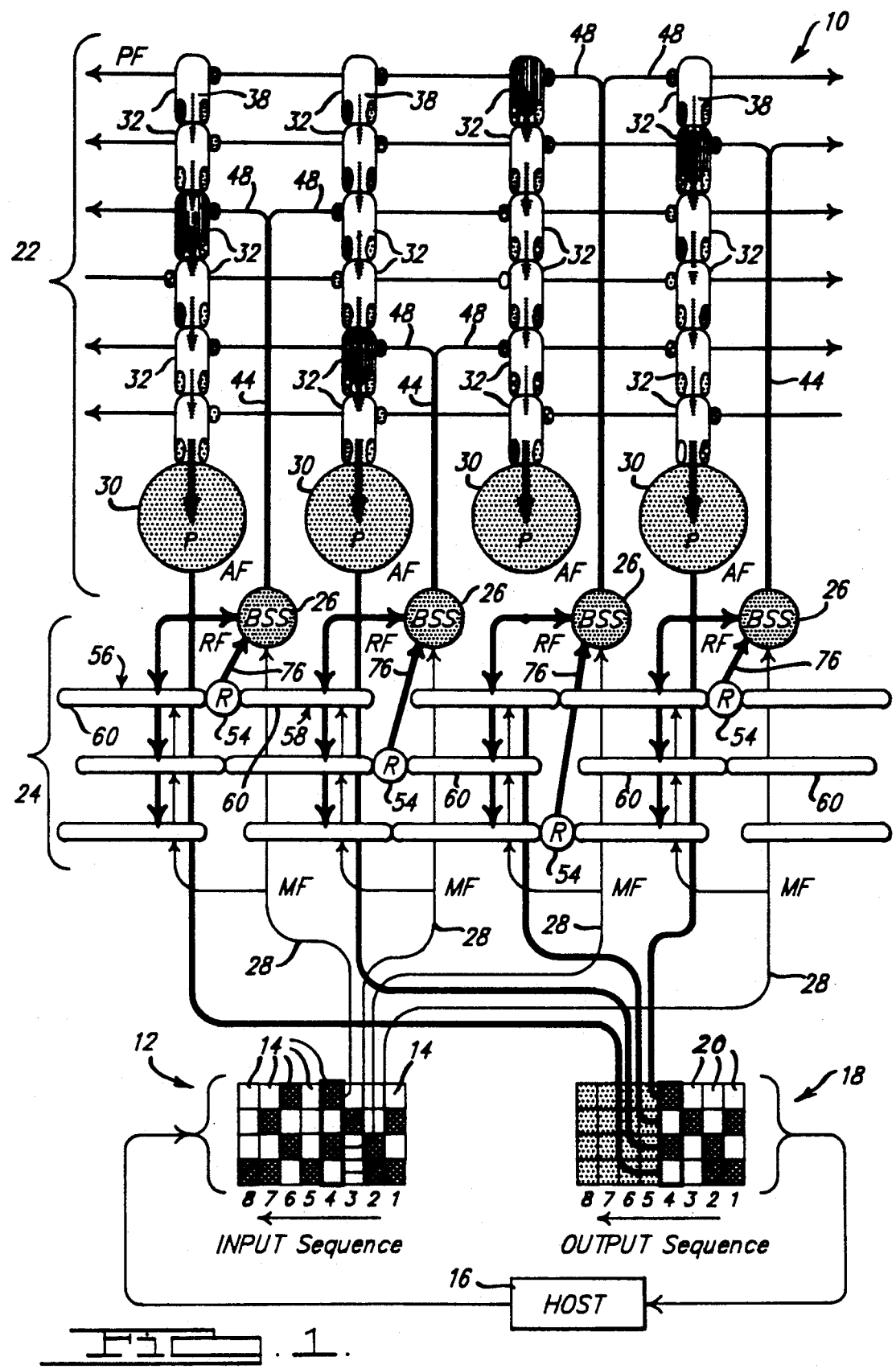
FIG. 1 is a diagram of a Katamic sequence processing system in accordance with the present invention.

The Katamic system addresses a broad class of sequence processing tasks. As discussed above, sequence processing generally involves learning sequences to perform either sequence recognition, sequence reproduction, or temporal association. Referring now to FIG. 1, a diagrammatic representation of the Katamic sequence processor 10 is shown. The Katamic system 10 operates on temporally varying patterns such as the input sequence 12 in FIG. 1. The system is shown during the processing of pattern #4 of an 8 pattern long input sequence 12. Each binary pattern 14 is a four bit wide pattern that varies in time. Thus, as illustrated, time proceeds from right to left and input pattern 14 labeled No. 1 is followed by Nos. 2, 3, 4, 5, 6, 7 and 8, consecutively. Each four bit binary pattern is represented by dark and light blocks, with the dark blocks representing "on" bits and the light box representing "off" bits It will be appreciated that the input sequence 12 may consist of input data from any number of domains which can be converted into a four bit wide pattern. Control of the binary patterns is maintained by host computer 16. In particular, the host computer 16 provides the input pattern and reads out the output pattern. It should be noted that it is one of the advantages of the present invention that input sequence 12 can be of any arbitrary width (number of bits in the pattern) since the Katamic system 10 can be scaled and reconfigured to any desired size due to its modular configuration, as will be appreciated from the discussion below.

One of the primary tasks of sequence processing is the recognition and/or completion of a given sequence. For example, where a particular sequence is known, it is frequently desirable to be able to have a system which automatically recognizes and classifies that sequence when it is presented to the system. Further, in many cases, the sequence to be recognized is incomplete and/or noisy. Thus, one of the chief advantages and functions of the Katamic system 10 is that an input sequence 12, once having been learned by the system, can later be recognized even when only parts (eg. only the first 2 or 3 input patterns 14) are presented. Alternatively, if a degraded or noisy version of the input signal 12 is presented, the system can produce the correct and complete learned sequence.

The Katamic system 10 accomplishes the above functions by producing an output sequence 18 which consists of output patterns 20. For each input pattern 14, the Katamic system 10 produces an output pattern 20 which is a prediction of the next expected input pattern. Thus, for example, if the input sequence 12 has already been learned by the Katamic system 10, the presentation of the first four patterns (eg. Nos. 1, 2, 3 and 4) of the input sequence 12 will be sufficient to trigger recognition of the rest of the input sequence 12 (Nos. 5, 6, 7 and 8). That is, the Katamic system 10 will generate output sequence 18 containing the remaining patterns in the sequence 12 without requiring any further portion of the input sequence to be presented. The way in which the Katamic system 10 accomplishes this will become apparent from the following discussion.

KATAMIC SYSTEM ARCHITECTURE

FIG. 1 shows a Katamic system 1 0 configured for processing four-bit wide input sequences. Accordingly, the Katamic system 10 includes four processing units called predictrons 22, four processing units called recognitrons 24 and four processing units called bi-stable switches 26. Each of these three types of neural elements have different functional characteristics.

The predictron 22 is the basic neuron-like computing element of the Katamic system 10. The number of predictrons in the system 10 is P. This number is adapted to match the number of input bits in the input patterns 14. The update cycle of this network will be referred to as the Katamic cycle or K-cycle. One input pattern 14 is processed during each K-cycle. At the beginning K-cycle each predictron 22 receives one external input bit from the input pattern 14 along input lines called mossy fibers (MF) 28.

The function of each predictron 22 is to learn to predict successive external inputs received along the mossy fibers 28. A specific name was chosen for this unit since it is functionally different and structurally more complex than the classical McCulloch-Pitts neuron. Each predictron 22 contains a soma 30 (cell body) and a single dendritic branch composed a column of several dendritic compartments 32.

Figure 2:
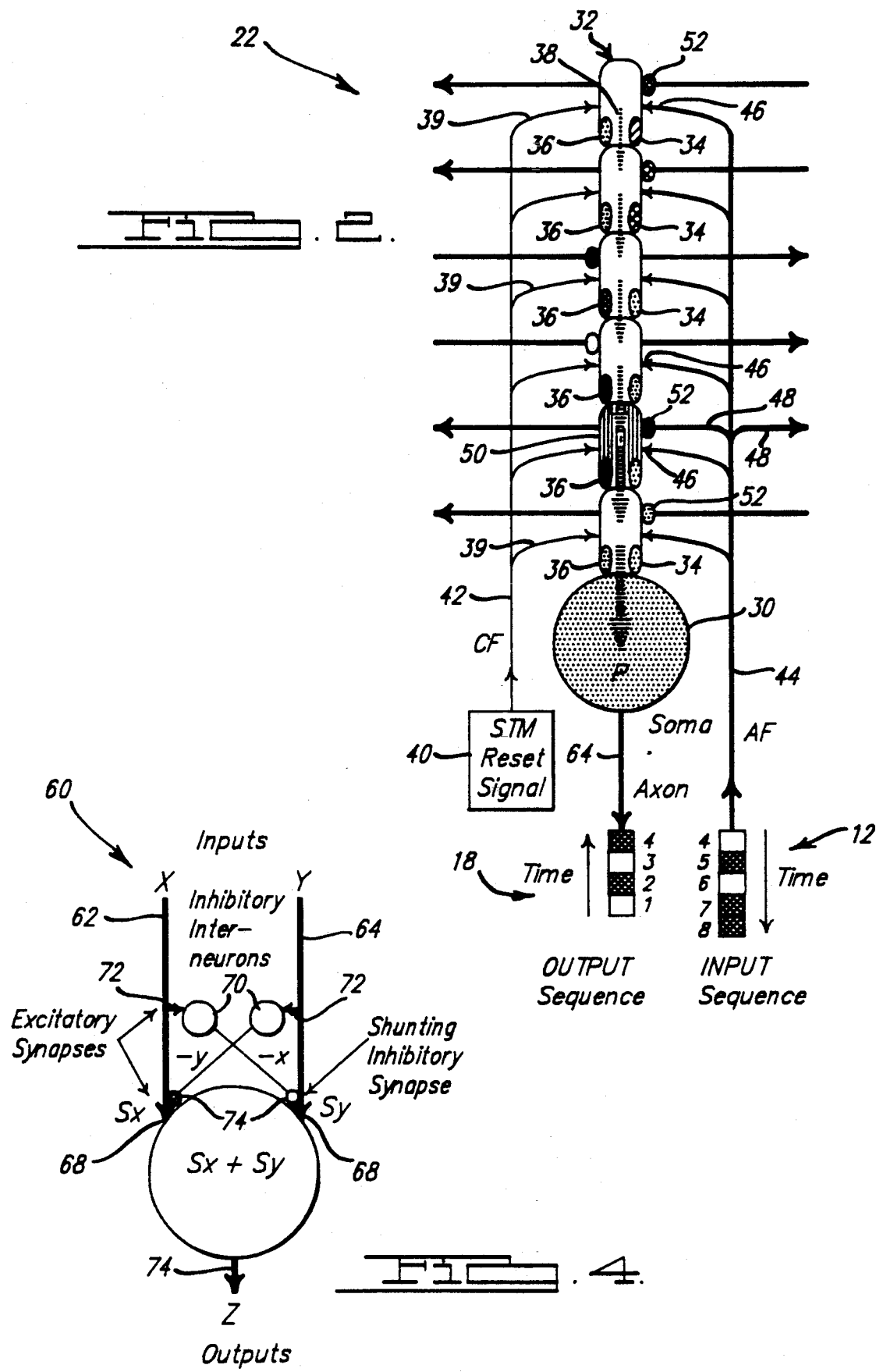
FIG. 2 is a diagram of one predictron in accordance with the present invention.

Referring now to FIG. 2, an isolated predictron 22 is shown. The number of dendritic compartments 32 (DC$^p$s) per predictron 22 is D$^p$. This number is generally the same for all predictrons 22 in a Katamic system 10. It should be noted, however, that having exactly the same of number of DC$^p$s 32 in each predictron 22 is not a strict requirement. The system 10 will operate even if the number of DC$^p$s is only approximately equal across predictrons 22. However, making them equal does simplify the implementation.

Each DC$^p$ 32 is characterized by three features or variables: 1) a positive long term memory 34 (p-LTM), 2) a negative long term memory (n-LTM 36), and 3) a short term memory (STM) 38. Each of these memories stores a real number between zero and one. The LTM memories 34 and 36 are used to store information about the spatial and temporal relations of the active (i.e. on or 1) bits in all sequences that were presented to the memory since its naive state; that is, before it has learned anything.

The STM 38 is used to store information about the spatial and temporal relations only among the most recently seen patterns in a given sequence. The term "spatial relations" in this context is used to mean the relationship between on bits within a given input pattern 14. Temporal relations refers to the relationship between on bits occurring sequentially along a given input channel, or mossy fiber 28.

The STM 38 has a specific dynamic characteristic. It "flows" toward the soma 30 with a speed of one DC$^p$ 32 per K-cycle; and at the same time it decays with the decay constant Tt. This dynamic behavior of the STM values 38 within the dendrite of each prediction serves a dual purpose: (1) It acts as an intracellular delay line, a feature which is used during learning as discussed below, and (2) as a "look one step ahead" mechanism which is used for prediction generation. Another feature of the STM 38 in each DC$^p$ 32 is that it is reset to its initial value at the beginning of every new sequence presented to the network. A STM reset signal generator 40 generates the reset signal along a climbing fiber (CF) 42 through branches 39 to each DC$^p$ 32.

The soma 30 of the predictron 22 is characterized by an activation value A$^p$(t). The activation value is computed at each K-cycle as the dot-product of the shifted STM 38 and the difference of the p-LTM 34 and the n-LTM 36 in the predictron's dendritic branch (i.e. the entire collection of $DC^p$s 32 in a given predictron 22). The state of each predictron at each time cycle is either "fire=one" or "silent=zero". If the somatic activation is larger than a threshold value $\Theta^p$ then the predictron 22 fires, otherwise it is silent.

The predictrons 22 are in a sense, a simplification of real neurons. Like real neurons, predictrons 22 have a soma 30, an axon, and a dendritic tree composed of $DC^p$s 32. Unlike real neurons, the dendritic tree of the predictron consists of only one single branch composed of a small number of $DC^p$s 32. It should be noted that the dashed arrows between the $DC^p$s 32 represent the STM 38. These arrows have different thicknesses to show that the values of the STM vary. The different shading of the small ellipses that represent the p-LTM 34 and the n-LTM 36, are used to illustrate that both pLTM's and nLTM's values are different across $DC^p$s 32.

The input sequence reaching the predictron 22, after passing through the bi-stable switch 26, (not shown in FIG. 2), travels up the ascending fiber (AF) 44 and travels to each $DC^p$ 32 through a non-modifiable synaptic contact 46 (represented by a small arrow) of weight value one. The purpose of these connections 46 is to pass unchanged the value of the input bit coming in along the AF 44 to the $DC^p$s 32 to act as kind of conditioning signal. The purpose of this conditioning signal is to provide the $DC^p$s with information about the values of input bits (0 or 1).

At a random location along the predictron 22 dendritic branch, each AF 44 bifurcates to produce a parallel fiber (PF) 48 which stretches in the horizontal direction across all the predictrons in the Katamic system 10. The $DC^p$ 32 that is at the level of the parallel fiber 48 for the AF 44 in a given $DC^p$ 32 is called the seed $DC^p$ 50, shown shaded with vertical lines. There is one seed $DC^p$ 50 per predictron 22 at a randomly selected location along the dendritic branch. It should be noted that the Katamic system 10 can function also with more than one seed $DC^p$ 50 per predictron 22. The parallel fiber 48 contacts the seed $DC^p$ 50 as well as the same level $DC^p$s of the rest of the predictrons 22 in the Katamic system 10 via non-modifiable weights 52. The values of the weights 52 of the PF synapses 52 are real numbers between 0 and 1 and are set such that they decrease exponentially (with decay constant TS) with distance from the seed-$DC^p$ 50. The purpose of PF connections 38 is to distribute each bit of the input pattern across all predictrons in the network. The decay of the weight values insures that the further away two predictrons are in the network, the less they influence each other.

As shown in FIG. 2, the seed-$DC^p$ weight 52 is depicted by a dark circle while other PF synapses 52 are depicted by lighter circles, which represent lower weight values due to the decay across predictrons 22. It should be noted that influence across predictrons is a parameter that can be set and the desirability will depend on the nature of the data, that is, whether the data and the application is such that it is desired to have adjacent bits affect a given predictron 22. It should also be noted that the Katamic system 10 can also be operated without decay so that all adjacent predictrons are influenced equally.

Figure 3:
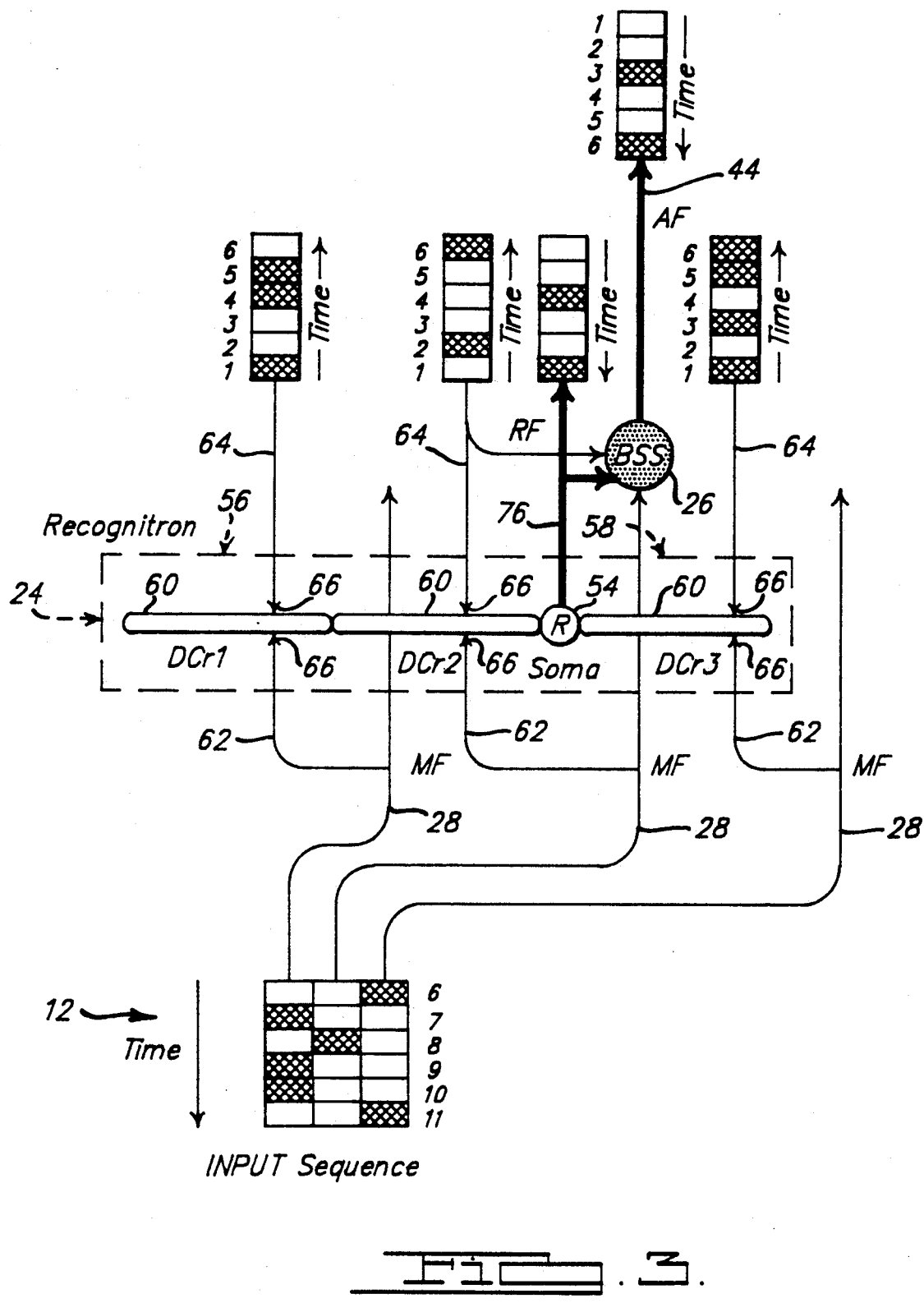
FIG. 3 is a diagram of a recognitron in accordance with the present invention.

The recognitron 24 is a bi-stable neural element depicted in more detail in FIG. 3. The function of the recognitron is to recognize, on a pattern-by-pattern basis, the input sequence. The number of recognitrons in a Katamic system 10 is R. Like the predictron 22, the recognitron 24 is composed of a soma 54 and a dendritic tree having two dendritic branches 56 and 58. Each dendritic branch is composed of dendritic compartments ($DC^r$s) 60. The total number of dendritic compartments 60 per recognition 24 is $D^r$. The soma 54 is characterized by an activation value $A^r(t)$ and a threshold $\Theta^r$.

In other possible modifications of the Katamic system 10 the number of dendritic compartments per recognitron can vary from one to P, depending on the choice of recognition criteria. For instance, one recognition criterion is "recognize on a predictron by predictron basis", i.e., when each predictron generates a correct prediction independently of the others. Another criterion is "recognize on a global basis", i.e., only when all predictrons generate correct predictions. Many variations between these two extremes are also possible. As shown in FIG. 3, the dendritic branch to the left of the soma 54 contains two $DC^r$ 60 and the one to the right has one $DC^r$ 60. This permits a given recognitron 24 to receive information about the input sequence associated with the predictron to which it is associated, as well as bits transmitted to and from neighboring predictrons. The arrows 66 shown in FIG. 3 at the end of the inputs to the $DC^r$s 60 represent non-modifiable synapses of weight one. Fibers that only bypass the $DC^r$s 60 (eg. 28) without making synaptic contacts do not have arrows.

The dynamics of the $DC^r$S 60 are different from those of the $DC^p$s 32. Each $DC^r$ 60 receives two inputs: an external input 62 which comes from the mossy fiber 28, and an internal input 64 which comes from a predictron's output, or axon. Each $DC^r$ 60 computes a logical ExOR of these two inputs.

In the spirit of the overall neural network architecture of the Katamic system, the ExOR function of two arguments is computed by a simple neural network that contains two inhibitory inner neurons and a simple summation unit-the $DC^r$ 60. However, in a hardware implementation, the $DC^r$s can be substituted by logical ExOR gates with two inputs. In more detail, FIG. 4 shows one example of a biologically plausible configuration for a $DC^r$ 60 which computes the ExOR function. The external input 62 (also called X), and the input coming from a predictron's output, or axon 64, (called Y) are shown. These inputs are passed to the $DC^r$ 60 via non-modifiable but modulated synapses 68, having a value of one, represented by large arrows. Two inhibitory interneurons 70 get inputs via collaterals (connections to the inputs) and make modulatory synapses 74 (shown by the small gray circles) to the presynaptic sites of the inputs. That is, the inhibitory interneurons 70 get excitatory input along connection 72 and make modulatory axoaxonal synapses 74 to the input lines 62 and 64. The function of these synapses 74 is to exert shunting inhibition. Shunting inhibition is a kind of inhibition which is ubiquitous throughout the nervous system. Its basic function is to block the transmission of the input signals through the synapse that is modulated. The circuit as a whole shown in FIG. 4 computes the ExOR function of the inputs and passes it to the output Z 74. Output Z 74 then is transmitted directly to the soma 54. The details of the ExOR computation is summarized in Table 1 below.

TABLE 1

| | | | Computation of ExOR | |
|---|---|---|---|---|
| X | Y | Sx | Sy | Sx + Sy = ExOR (X,Y) |
| 0 | 0 | 0 | 0 | 0 |
| 0 | 1 | 0 | 1 | 1 |
| 1 | 0 | 1 | 0 | 1 |
| 1 | 1 | 0 | 0 | 0 |

At each K-cycle, the results of the ExOR computations are summed algebraically across the recognitron's $DC^r$'s and form the "somatic activation" $A^r(t)$ of the recognitron. The value of A, in the range of zero to $D^r$, where $D^r$ equals the number of $DC^r$'s per recognitron. The somatic activation is further output value passed along the recognitron's axon 76 is one, otherwise it is zero. It can be seen that for each $DC^r$ 60 there will be an output of one along line 74 only if there is a mismatch between the X and Y inputs; that is, if there is a mismatch between the predictron 22 output along the predictron axon 64 and the external input received by the $DC^r$ 60 along mossy fiber 62. In other words, if the prediction from the predictron 22 is correct, there will be a match and output of value 0 on line 74. Conversely, if the predictron is wrong there is a mismatch and there will be an output of value 1 on line 74. Thus when soma 54 integrates all of the $DC^r$ outputs, larger values will represent a greater number of mismatches, or wrong predictions. In brief, the state of the recognitron is a function of the similarity between an external input pattern coming along an external input 28 and an internal input-the predicted pattern coming via the predictron's axon.

Figure 5:
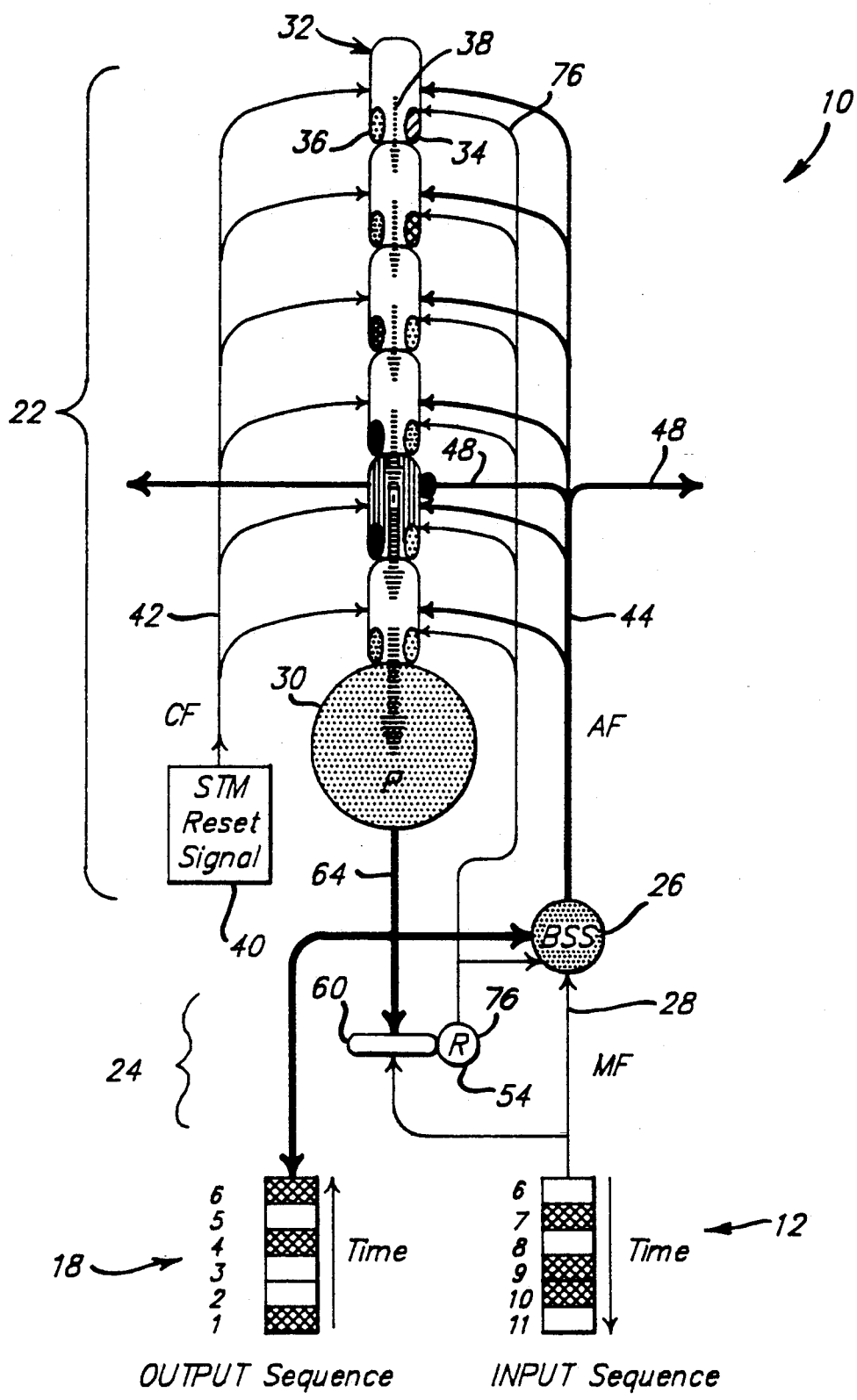
FIG. 5 is a diagram of a predictron together with a recognitron and a BSS in accordance with the present invention.

The information from the recognitron soma 54 regarding whether a predictron has failed (represented by firing of the recognitron soma 54) or that it was correct (represented by the recognitron soma 54 being silent) is conveyed in two ways. First, this information is transmitted along recognition fiber (RF) 76 to each $DC^p$ 32 of the corresponding predictron 22 as shown in FIG. 5. It should be noted that this line is omitted in FIG. 1 for the sake of simplicity of illustration. Second, the state of the recognitron soma 54 is transmitted along recognition fiber 76 to the corresponding bi-stable switch 26. The recognitron 24 acts as a controller of the bi-stable switch 26.

There is one bi-stable switch (BSS) 26 per predictron 22. Each BSS gets three one bit inputs and generates one output bit. Two of the inputs are "data" inputs, one bit from the external input sequence along MF 28, and the other from the output (axon) 64 of the corresponding predictron 22. The third input to the bi-stable switch 26 is a "control" bit which is the output of the corresponding recognitron coming along line RF 76. The function of the bi-stable switch 26 is to select one of the two data inputs (the external input 28 or the internal input 64) and to copy it to the output line of the bi-stable switch 26, which is AF line 44. The input selection is controlled by the control bit from the recognitron along RF line 76. Thus if the output passed along the recognitron axon 76 is a one (indicating that the prediction has failed) the bi-stable switch 26 will select the external input along line 28. On the other hand if the output value passed along the recognitron axon 76 is a zero (indicating that the prediction was correct) then the bi-stable switch 26 will select the internal input from line 64.

Effectively, the bi-stable switches 26 enable internal sequence completion since external inputs are not needed when correct predictions are made. For instance, after a particular sequence has been learned, the bi-stable switch 26 switches off the external input and allows the output of the predictron along line 64 (which corresponds to the predictions made) to be used as inputs in the next time cycle. This input then is transmitted along the AF line 44 as described above.

FIG. 5 represents the canonic circuit of the Katamic system 10 which consists of one predictron 22, one recognitron 24 and one bi-stable switch 26. FIG. 1 is an example of a small scale Katamic system 10 in which the number of predictrons P in this network is four, the number $DC^p$'s per predictron is six, and the number of recognitrons and bi-stable switches 26 is also four. The number of predictrons and $DC^p$'s may vary widely.

KATAMIC NETWORK DYNAMICS

During each K-cycle the Katamic system 10 goes through one complete pass of a Katamic procedure to be described below. Input patterns 14 are presented in an orderly fashion; that is, one bit per predictron and one pattern per K-cycle. Each input bit reaches one bi-stable switch 26 via the corresponding mossy fiber 28. While the first bit along the mossy fiber 28 will be passed through the bi-stable switch 26 to the ascending fiber 44, from then on, the predictron 22 begins generating an output and the bi-stable switch 26 will either pass that output, or will pass additional external inputs to the ascending fiber 44 depending on the recognitron 24 output.

After passing through the bi-stable switches 26, the input bits (whether from the mossy fiber 28 or from the predictron axon 64) are sent along the ascending fibers 44 to the dendritic trees of the predictrons 22. The connections made by the ascending fibers synapses 46 are used to convey the value of the input (0 or 1) to the $DC^p$'s 32. This information is used during learning, as discussed more detail below. Learning in the Katamic system 10 means the change (i.e. update) of the p-LTM 34 or the n-LTM 36 in each $DC^p$ 32 as a result of the current value of the STM 38 in this $DC^p$ 32, as well as a result of a number of conditions. The synaptic connections made by the parallel fibers 48 are used to "inject" STM data into the corresponding $DC^p$'s 32. The injected STM data is used to update the value of the STM 38 in each compartment 32 where STM was injected. Then the updated value of the STM 38 is used as an argument in the update function of the LTMs 34 and 36.

Predictrons 22 use the relations between the LTMs 34 and 36, and the STM 38 in their $DC^p$ 32 to make predictions (at each K-cycle) about the next pattern in the sequence. A prediction is generated by comparing the shifted (one $DC^p$ 32 towards the soma 30) pattern of the STM 38 values distributed in the $DC^p$'s of a predictron 22 to the patterns of the p-LTM 34 and n-LTM 34 and n-LTM 36. For instance, if the STM 38 pattern is more similar to the p-LTM 34 than to the n-LTM 36, then the predictron fires, otherwise it is silent. In a given predictron 22, the comparative similarity between the p-LTM 34 and the n-LTM 36 dendritic distribution to the STM 38 distribution is learned through experience. The p-LTM 34 or the n-LTM 36 of each predictron are updated (i.e. learning occurs) at each K-cycle using a two stage updating rule:

Stage 1: (Learning condition)

Predictrons 22 learn at each K-cycle only when their expectation (i.e. prediction generated at the previous K-cycle about the input at the current K-cycle) fails. In the Katamic system 10 there are only two possible ways for a prediction to fail:

1. Wrong-zero-prediction. This occurs when the input is one and the prediction made for that input is zero.
2. Wrong-one-prediction. This occurs when the input is zero and the prediction made is one.

Stage 2: (Modification Function)

If the learning condition of stage 1 is met, and:
if a predictron makes a wrong-one-prediction, then update the n-LTM 36 in all of its $DC^p$s 32 using the corresponding STM 38 as an argument to a sigmoidal update function.
if a predictron 22 makes a wrong-zero-prediction, then update the p-LTM 34 in all of its $DC^p$s 32 using the STM 38 in the same way.

The dynamics of the Katamic system 10 described above, are presented in more detail in the following eight steps. Each of these steps are executed by the system 10 at each K-cycle.

Step 1. Get Input

An input pattern I(t), such as the pattern 14 shown in FIG. 1, is passed to the predictrons 22 (one bit per predictron) from the corresponding bi-stable switches 26 along the AF's 44 and PF's 48. If this is the first K-cycle, before any training has occurred, the external input $I_{ext}(t)$ coming along mossy fiber 28 will be passed by the bi-stable switch 26 (i.e. $I(o) = I_{ext}(O)$) At all subsequent K-cycles, the input pattern passed by the bi-stable switch 26 will depend on the state of the recognitron output 76 as described above.

Step 2. Inject STM to $DC^p$s:

At the seed $DC^p$ 50 of each predictron 22 which receives input 1 ($I_i(t)=1$), inject STM of value 1. If the predictron receives a zero, nothing is injected to the seed $DC^p$ 50 along this ascending fiber 44. Here i is the i-th predictron 22, and j is the j-th level $DC^p$. Let $i_o$ be the subset of predictrons which receive input 1 at K-cycle t. Let $d_{ij}$ be the matrix of all $DC^p$s of all predictrons. Let all seed-$DC^p$s have a value $d_{ij}=1$, while all non-seed $\overline{DC^p}$s have a value $d_{ij}=0$. Then, $$\forall\ i\epsilon(1,P)\wedge j\epsilon(1,D^p)\ \text{such that}\ \{I_i(t)=1 d_{ij}=1\}\ \text{set}\ \Delta s_{ij}(t) = \forall \quad (1)$$

Here, $\Delta s_{ij}(t)$ is the value of the injected STM in the ij compartment at time t (Note: $\Delta s_{ij}(o)=0$.)

In all $DC^p$s of the neighboring predictrons that are at the same level as the seed-$DC^p$ of a given predictron inject STMs with values equal to the synaptic weights made by the PF to these $DC^p$s. Notice that the values of the PF synaptic weights are set such that they decay exponentially with a decay constant Ts.

$$\wedge_j \epsilon(1,D^p)\ \text{such that}\ \Delta s_{io j}(t) = 1\ \text{set} \quad \Delta s_{ij}(t) = \epsilon |i-i_o| Ts \quad (2)$$

Step 3. Update STM at each DCP

The increment of the STM value at each $DC^p$ carries information about the spatial relationships between the 1-bits in the input patterns. The further apart space-wise two 1-bits are, the smaller the value of the injected STM due to exponential decay. The STM value in each $DC^p$ is updated using the injected-STMs $\Delta s_{ij}(t)$ and the value of the STM at the previous K-cycle $s_{ij}(t-1)$ as inputs to a sigmoidal update function. This specific update function was chosen because it is monotonic and saturates.

$$s_{ij}(t) = \sigma[s^o_{ij}(t)s_{ij}(t-1) - b\Delta s_{ij}(t)] \quad (3)$$

where:

$$\sigma(x) = \frac{1}{1 + e^{-x}}$$

b is the STM-update rate which determines the effect of the injected STM in a given $DC^p$ on the previous STM value in this compartment.

$s^o_{ij}(t)$ is an STM normalization factor which is chosen such that $$\text{IF}\ \Delta s_{ij}(t) = 0\ \text{THEN}\ s_{ij}(t) = s_{ij}(t-1). \quad (4)$$

This is ensured when:

$$s^o_{ij}(t) = \frac{1}{s_{ij}(t-1)} \ln\left(\frac{1}{s_{ij}(t-1)} - 1\right)$$

Step 4. Modify LTM

The approach is to "imprint" the momentary pattern of the STM over the $DC^p$s into the pattern of LTM. The function of the Recognition Fibers (RF) is to provide information to the $DC^p$s about the status of recognition (0 --correct, 1 --incorrect). This signal is used in step 4 in the modification of the LTM. Each predictron (and respectively each $DC^p$) uses the recognition signal to evaluate the condition defined in stage 1 of the learning rule. If the predictron is correct (recognition signal =0), then no learning (update of LTM) happens and stage 2 is bypassed.

Using the 2-stage learning rule discussed above, the LTM is modified in the following manner:

If at time t-1 predictron i generates an output which is a wrong -zero- prediction, then the p-LTM value in each $DC^p$ of this predictron are modified (learning occurs) as follows:

$$\forall\ i\epsilon(1,P)\ \ j\epsilon(1,D^p)\ \ \text{IF}\ \{(I_i(t) = 1)\ (O_i(t-1) = 0)\} \quad (5)$$

$$\text{THEN set}\ p_{ij}(t) + \sigma[P^o_{ij}(t)p_{ij}(t-1) - cs_{ij}(t)]$$

where:

c is the learning rate (i.e. LTMs update rate) and $P^o_{ij}(t)$ is the p-LTM normalization factor which is chosen such that $$\text{IF}\ s_{ij}(t)=0\ \text{THEN}\ p_{ij}(t)=p_{ij}(T-1).$$

This is ensured when:

$$\wedge\ p^o_{ij}(t) = \frac{1}{p_{ij}(t-1)} \ln\left(\frac{1}{p_{ij}(t-1)} - 1\right) \quad (6)$$

If at time t-1 predictron i generates an output which is a wrong-one-prediction, then the n-LTM value in each $DC^p$ of this predictron are modified as follows:

$$i\epsilon(1,P)\ \ j\epsilon(1,D^p)\ \ \text{IF}\ \{(I_i(t) = 0)\ (O_i(t-1) = 1)\} \quad (7)$$

$$\text{THEN set}\ n_{ij}(t) = \sigma[n^o_{ij}(t)n_{ij}(t-1) - cs_{ij}(t)]$$

where:

$n^o_{ij}(t)$ is the n-LTM normalization factor which is chosen such that

IF $s_{ij}(t)=0$ THEN $n_{ij}(t)=n_{ij}(t-1)$.     5

This is ensured when:

$$n^o_{ij}(t) = \frac{1}{n_{ij}(t-1)} \ln\left(\frac{1}{n_{ij}(t-1)} - 1\right) \tag{8}$$

Step 5. Temporal Encoding

Shift the value of the STM in each $DC^p$ to the next dendritic compartment towards the soma (replacing the previous STM value) and decay it with a temporal time constant Tt. This processing step produces an encoding of the temporal order of the 1-bits in the successive patterns since it constructs a temporal history of the successive 1-bit inputs to a given predictron which is reflected in the STM pattern in the dendritic branch of each predictron. In a predictron, the later a 1-bit input comes with respect to the previous 1-bit input, the smaller is the STM trace left by the previous input.

$$s_{ij}(t) = s_{ij-1}(t)e^{Tt} \tag{9}$$

The boundary condition is: for $j=0$ set $s_{10}(t)=0$ or $s_{10}(t)=s_{iDP}(t)$ (used currently).

The boundary condition is: for $j=0$ set

Step 6. Predict next input:

The output pattern $0(t)$ of the network at each time cycle is actually a prediction of the input vector $I(t+1)$ at the next cycle. $O(t)$ is generated as follows: (1) Calculate the somatic activation as the dot-product of the STM and the per $DC^p$ difference of the LTMs (p & n) for each of the predictrons. The result of this calculation shows whether the shifted STM pattern is more similar to the p-LTM pattern or to the n-LTM pattern. (2) Make the decision to fire the predictron (1-prediction) or not (0-predictron) by comparing its activation to the threshold $\Theta P$.

$$\forall \; i\epsilon(1,P) \text{ compute } A_i^P(t) = \sum_{j=1}^{DP} s_{ij}(t)(p_{ij}(t) - n_{ij}(t)) \tag{10}$$

$$\text{IF } A_i^P(t) \begin{cases} \geq \phi^P \text{ THEN set } O_i^P(t) = 1 \text{(predictron fires)} \\ < \phi^P \text{ THEN set } O_i^P(t) = 0 \text{(predictron silent)} \end{cases} \tag{11}$$

Step 7. Attempt sequence recognition

At this step of the algorithm each recognitron computes its somatic activation as the sum of the results of an ExOR function ($F_{exor}$) applied to the two inputs of each $DC^r$, the next "external" input ($\text{Iext}_i$) coming along the corresponding MF, and "internal" input $O_i^P(t)$ -- the output of the predictron at this K-cycle.

$$\forall \; i\epsilon(1,R) \text{ compute } A_i^r(t) = \sum_{k=1}^{D^r} F_{ExOR} \left(\text{Iext}_{i-k}(t+1) \;\; O_{i-k}^p(t)\right) \tag{12}$$

-continued $$\text{IF } A_i^r(t) \begin{cases} \geq \theta^r \text{ THEN set } O_i^r(t) = 1 \text{(recognitron fires)} \\ < \theta^r \text{ THEN set } O_i^r(t) = 0 \text{(recognitron silent)} \end{cases} \tag{13}$$

Step 8. Generate next input

The input pattern for the next K-cycle $(I(t+1))$ is generated by the BSSs-One bit per BSS. As it was described above, each BSS 26 takes 3 inputs, 2 "data" inputs (one "external" ($\text{Iext}_i(t+1)$) which comes along the MF, and one "internal" ($\text{Iint}_i(t+1)$) provided by the axon of the corresponding predictron which is actually the $O_i^p(t)$, and a "control" input from the corresponding recognitron ($O_i^r(t)$)). All of these inputs can take values 0 or 1. The BSS functions as a simple gating device:

$$\forall \; i\epsilon(1,R) \tag{14}$$

$$\text{IF } O_i^A(t) \begin{cases} = 0 \text{ (correct prediction)} & \text{THEN set } I(t+1) = \text{Iint}_i(t+1) \\ = 1 \text{ (failed prediction)} & \text{THEN set } I(t+1) = \text{Iext}_i(t+1) \end{cases}$$

Figure 6:
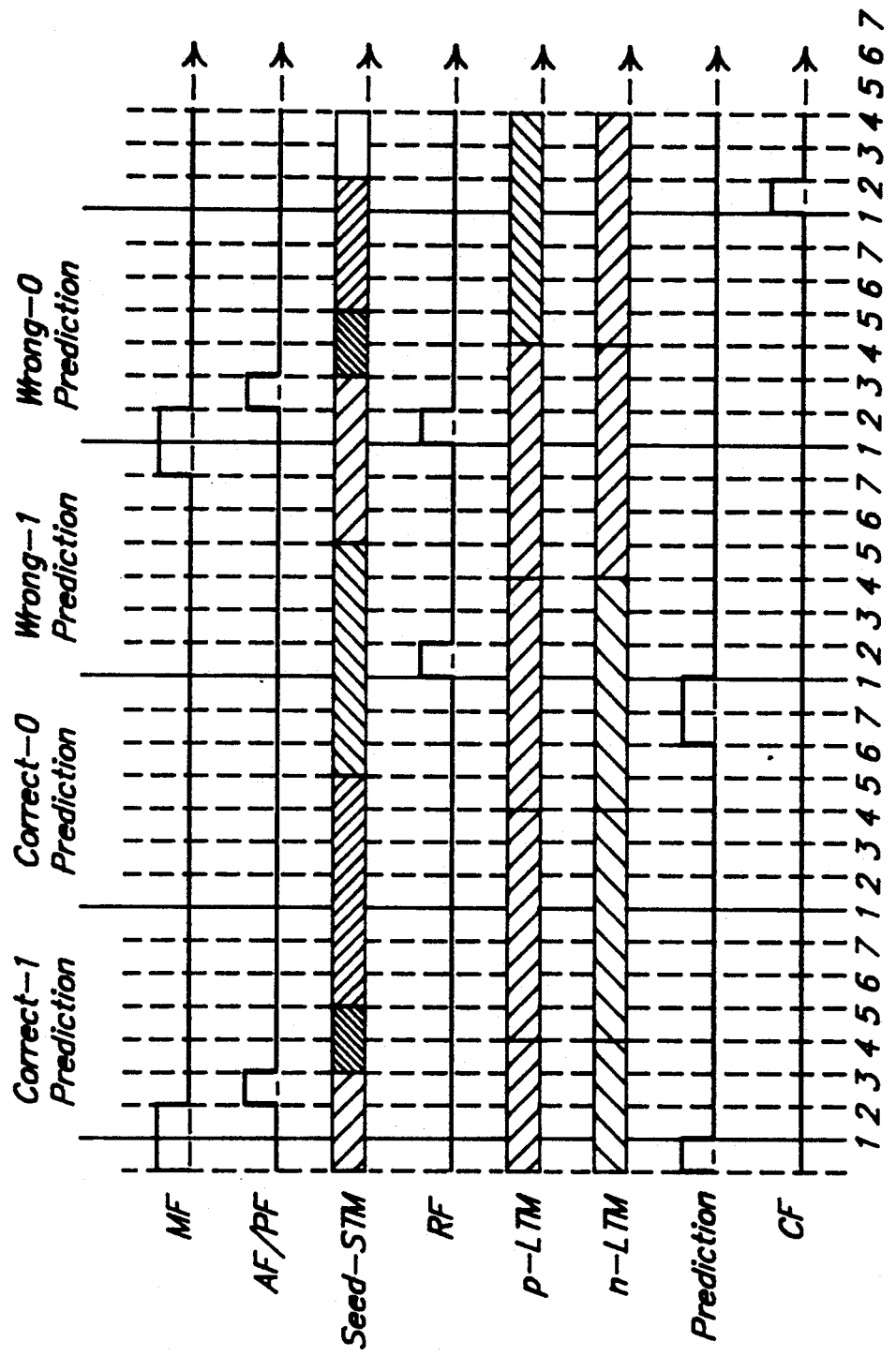
FIG. 6 is a diagram of eight representative signals produced within the Katamic system of the present invention.

Referring now to FIG. 6, a signal flow diagram of the Katamic system 10 is shown. Eight signals are shown at various stages in the Katamic system 10. In particular, each signal is shown during the above-discussed eight steps of the K-cycle. Also, four successive K-cycles are shown, the first one, indicating a correct—one—prediction; second, a correct—zero— prediction; the third, a wrong—one prediction; and the fourth, a wrong—zero—prediction. The eight signals shown are for an individual canonical circuit comprising a predictron 22, recognitron 24, and bi-stable switch 26. The signals are representing those on the mossy fiber (MF) 28; the ascending/parallel fiber, (AF/PF) 44, 48; the recognition fiber (RF) 76; the predictron axon 64 (prediction); are the climbing fiber (CF) 42. Also, the values of the STM 38, the p-LTM 34, and n-LTM 36 are shown for the seed $DC^p$ 50 of one predictron 22. These values are represented as different shades of gray so that white=0, and black=1.

It should be noted that the four K-cycles shown in FIG. 6 are not necessarily the first four steps of a sequence, which is why the STM, the p-LTM and the n-LTM are shown to have some non-zero values at the beginning. The diagram in FIG. 6 illustrates what happens during each of the four possible situations with respect to the types of predictions made in the four cases. (Correct—one—prediction, correct—zero— prediction, wrong—one—prediction, wrong—zero—prediction). Of course, these cases may occur in any arbitrary order. The processing of each pattern in a K-cycle is divided into seven steps represented by the vertical dotted lines which correspond the steps of the Katamic system 10 discussed above. It should be noted that step 8 in the Katamic system,—the generation of the next input is equated with step 1, that is, getting the next input.

While those skilled in the art will appreciate that the Katamic system 10 can be implemented using conventional electronic devices and circuits, evolution and testing are more easily accomplished by simulating the system functions in software. Further, mathematical analysis of a multi-parametric dynamic system such as the Katamic system 10 is not straightforward. Because of the highly parallel nature of the Katamic system 10, a highly parallel processor is best suited to such a software implementation. One such suitable processor is the CM-2 Connection Machine manufactured by Thinking Machines Co. of Cambridge, Mass. A suitable programming language is *LISP which is data parallel extension of common LISP. In one set of tests, the Katamic system 10 was evaluated on the Connection Machine using the following parameters and variables:

| symbol | description | typical values |
|---|---|---|
| parameters | | |
| P | number of predictrons | 64 |
| $D^p$ | number of $DC^p$s per predictron | 512 |
| R | number of recognitrons | 64 |
| $D^r$ | number of $DC^r$s per recognitron | 7 |
| $T_s$ | time constant for STM spatial decay | $-0.01$ |
| $T_t$ | time constant for STM temporal decay | $-0.01$ |
| b | STM update rate | 5.0 |
| c | LTMs update (learning) rate | 1.0 |
| $\Theta^p$ | firing threshold of the predictrons | 0 |
| $\Theta^r$ | recognition threshold of the recognitrons | 5 |
| variables | | |
| $p_{ij}(t)$ | positive LTM | $p_{ij}(0) = 0.5$ |
| $n_{ij}(t)$ | negative LTM | $n_{ij}(0) = 0.5$ |
| $s_{ij}(t)$ | STM | $s_{ij}(0) = 0.001$ |
| $\Delta s_{ij}(t)$ | STMs injected | $\Delta s_{ij}(0) = 0.0$ |
| $s_{ij}^o(t)$ | STM normalization factor | $s_{ij}^o(0) = 0.001$ |
| $p_{ij}^o(t)$ | p-LTM normalization factor | $p_{ij}^o(0) = 0.001$ |
| $n_{ij}^o(t)$ | n-LTM normalization factor | $n_{ij}^o(0) = 0.001$ |
| $A_i^p(t)$ | Activation of predictron i | $\epsilon(0,1)$ |
| $A_i^r(t)$ | Activation of recognitron i | $\epsilon(0,D^r)$ |
| $O_i^p(t)$ | Output of predictron i | $\epsilon\{0,1\}$ |
| $O_i^r(t)$ | Output of recognitron i | $\epsilon\{0,1\}$ |

In addition, other ratios of predictrons to $DC^p$s were tested including: 64:256 and 64:128, which correspond to 16,384 and 8,192 compartments. Each dendritic compartment was associated with one virtual processor in the connection machine.

It will be appreciated that many variations on the Katamic system 10 are possible depending on the particular application, which may vary widely. For example, the Katamic system 10 may be applied to natural language processing tasks (e.g. temporal variable binding, processing of recursive sentence structures, etc.) It can also be applied to a music learning task where the system can learn and recall several variations on a musical structure. One important application is in the area of robotics; that is, the design of trainable motion control devices. Also, the system is useful for the prediction of time series of complex patterns observed in signal processing, speech processing, socio—economic and market trends, and others.

The performance of the Katamic system 10 depends on a number of factors. One factor which will vary with the application will be the desired degree to which the decision about the goodness of a prediction depends on the correctness of the predictions made by the predictrons surrounding a given predictron. The acceptable degree of performance of the neighboring predictrons is reflected in the magnitude of the recognitron's threshold which is a value that can be set by the user. Further, the $T_s$ and $T_t$ decay constants will effect greatly the degree to which neighboring predictrons effect a given predictron. By choice of these variables, the system 10 can be made to operate in one of two extreme modes or anywhere in between. These extreme modes are:

1. Local recognition. This is the case where the decision about which input (INT, or EXT) should be used by a predictron depends only on its own performance at the previous cycle. In this situation, each recognitron needs to have only one dendritic compartment ($DC^r$).

2. Global recognition. This is the case where, unless all predictrons in the network have made correct predictions (i.e. a whole pattern in the sequence has been recognized), none of them is allowed to use an internal input at the next time step. In this situation, we need as many $DC^r$s per recognitron as there are predictrons (one $DC^r$ per predictron). Actually, since the decision for all predictrons is the same, the system can operate with only one recognitron connected to all the bi-stable switches.

It should be noted that once the Katamic System 10 is trained to recognize a particular input sequence 12, no further training is necessary. Thus, one may then produce multiple versions of the trained Katamic System 10 without repeating the training process. This may be done by constructing simplified versions of the trained Katamic System having fixed values for all of the variables in the trained system. That is, all of the learned variables such as STM, LTM etc., would be copied from the trained system to the fixed valued copies. This would facilitate mass production of fixed variable sequence processors for recognizing a particular sequence.

In accordance with the foregoing, a Katamic system 10 is disclosed which has a number of important and interdependent functional characteristics and advantages. These include rapid learning; large memory capacity; sequence completion capability; sequence recognition capability; fault tolerance; noise tolerance; robustness of performance; straightforward scaleability and integrated processing. Those skilled in the art can appreciate that other advantages can be obtained from the use of this invention and that modification may be made without departing from the true spirit of the invention after studying the specification, drawings and following claims.

What is claimed is:

1. A system for processing data consisting of a temporal sequence of patterns, said system comprising:
 a plurality of external and internal input means for receiving and transmitting data signals representing an element of one of said patterns;
 a plurality of prediction means coupled to said external input means for producing an output signal value that is a prediction of a future data signal value in said temporal sequence pattern;
 each prediction means including a plurality of interconnected dendritic compartments connected to an associated one of said internal input means for storing and transforming said input data signals;
 said prediction means including a processing element producing an output activation value at its output based on its input, said processing element connected to at least one of said dendritic compartments, wherein said processing element includes means for producing an activating value which is a function of said transformed input signals from said plurality of dendritic compartments;
 recognition means coupled to said external input means, and also to one associated prediction means output for producing an output signal only when a current prediction means output in response to a current input from said temporal pattern matches the next external input data signal from a subsequent input from said temporal pattern; and gate means with inputs coupled to the output of an associated prediction means and also coupled to the output of said recognition means, said gate means also coupled between said external input means and said internal input means, the gate means operative to selectively direct either the external input means or the prediction means output to said internal input means depending on the state of the recognition means output, whereby when said current prediction means output matches the next external data signal, the prediction means produces its next output without an additional external input.

2. The system of claim 1 wherein said internal input means includes a weighted connection from one of said gate means to one of said dendritic compartments in said associated prediction means and also to dendritic compartments in a plurality of other prediction means.

3. The system of claim 2 wherein said internal input means includes a non-weighted connection to each of the dendritic compartments in said associated prediction means.

4. The system of claim 3 wherein said interconnected dendritic compartments in a given prediction means are arranged in a column-like structure with the bottom dendritic compartment in said column being connected to said processing element, and each dendritic compartment is connected to the one below it in the column, each dendritic compartment also including a positive long term memory means, a negative long term memory means, and a short term memory means, each memory means storing one of said transformed input data signal values.

5. The system of claim 4 wherein said function used by said processing element to determine its activation value is proportional to the dot product of the difference between the data values in said positive and negative long term memories and the data values in said short term memories int he dendritic compartment.

6. The system of claim 5 wherein said short term memory means in a selected dendritic compartment stores said data signal transmitted by said internal input means and wherein a decayed representation of said signal value is transferred to the adjacent short term memory means nearer said processing element in said column when a subsequent pattern in said sequence is received, said system further including a means for resetting all of said short term memories each time a new sequence is processed.

7. The system of claim 6, wherein said activation value and said data signals representing a portion of one of said patterns are either one's or zero's and wherein said positive and negative long term memories are updated by receiving data signals from said internal input means only when said prediction means output does not match the next input data signal, wherein said negative long term memory is updated when said prediction means makes a non-matching one prediction, and said positive long term memory is updated when said prediction means makes a non-matching zero prediction.

8. The system of claim 2 wherein said recognition means further comprises:

a plurality of comparison means each connected to one of said external input means, and also connected to said associated prediction means output;

said comparison means producing an output signal only when the data signal value on said external input means does not match said associated prediction means output;

means for summing the outputs of said comparison means;

means for comparing said sum to a predetermined threshold; and means for transmitting an output to said gate means only when said sum exceeds the threshold, whereby said output is transmitted to said gate only when said prediction means has failed to produce a correct prediction.

9. The system of claim 1 wherein each of said plurality of said prediction means receives a different element of one of said input patterns, there being the same number of prediction means as elements in said input pattern.

10. The system of claim 9 wherein each of said comparison means comprises means for computing an exclusive-or function of the data signal value received from said connected input means.

11. The system of claim 10 wherein said recognition means has at least three comparison means, one connected to said associated prediction means, and the other two connected to other prediction means.

12. The system of claim 5, wherein said internal input means further comprises means for transmitting said input signal to dendritic compartments in prediction means adjacent to its associated prediction means.

13. A method for processing data consisting of a temporal sequence of patterns, said method comprising:

receiving and transmitting data signals representing an element of one of said patterns;

producing an output signal in a prediction unit that is a prediction of a future data signal value in said temporal sequence pattern;

storing and transforming said input signals in a plurality of dendritic compartments in said prediction unit;

producing an output activation value in a processing element in said prediction unit that is a function of said input signal from said plurality of dendritic compartments;

providing an external input network and an internal input network which is connected to at least one of said dendritic compartments in an associated prediction means;

providing a recognition unit coupled to said external input network, and also to one associated prediction unit;

producing an output signal in said recognition unit when a current prediction unit output in response to a current input from said temporal pattern matches the next input data signal in said eternal input network from a subsequent input from said temporal pattern; and selectively directing in a gate unit the external input network or an associated prediction means output to said internal input network depending on the state of the recognition unit output, whereby when said current prediction means output matches the next external data signal, the prediction unit produces a next output without an additional external input.

14. The method of claim 13 further comprising the step of providing a weighted connection from one of said gate units to one of said dendritic compartments in said associated prediction unit and also to dendritic compartments in a plurality of other prediction units.

15. The method of claim 14 further comprising the step of providing a non-weighted connection with said internal input network to each of the other dendritic compartments in the associated prediction unit.

16. The method of claim 15 further comprising the steps of:
   arranging said interconnected dendritic compartments in a given prediction unit in a column-like structure with the bottom dendritic compartment in said column being connected to said processing element, and each dendritic compartment being connected to the one below it in the column, each dendritic compartment also including a positive long term memory, a negative long term memory and a short term memory; and
   producing said activation value in said processing element as a function of the relation between the data values in both long term memory and short term memory in the dendritic compartment.

17. The method of claim 16 further comprising the step of storing said data signal transmitted by said internal input network in said short term memory and transferring a decayed representation of said signal to the adjacent short term memory nearer said processing element in said column when a subsequent pattern in said sequence is received.

18. The method of claim 17 wherein the step of producing an output activation value further comprises the step of determining the dot product of the data values in the short term memory and the difference between the data values in the positive and negative long term memory in each dendritic compartment in a prediction unit.

19. A neural network for recognition of sequences of patterns, said neural network comprising:
   a plurality of external and internal input means for receiving and transmitting data signals representing an element of one of said patterns;
   a plurality of prediction means coupled to said external input means for producing an output signal value that is a prediction of a future data signal value in said temporal sequence pattern;
   each prediction means including a plurality of interconnected dendritic compartments connected to an associated one of said internal input means for storing and transforming said input data signal values;
   said prediction means including a processing element producing an output activation value at its output based on its inputs said processing element connected to at least one of said dendritic compartments, wherein said processing element includes means for producing an activation value which is a function of said transformed input signals form said plurality of dendritic compartments;
   recognition means coupled to said external input means, and also to one associated prediction means output for producing an output signal only when a current prediction means output in response to a current input from said pattern matches the next external input data signal form a subsequent input from said pattern;
   gate means with inputs coupled to the output of an associated prediction means and also coupled to the output of said recognition means, said gate means also coupled between said external input means and said internal input means, the gate means operative to selectively direct either the external input means or the prediction means output to said internal input means depending on the sate of the recognition means output, whereby when said current prediction means output matches the next external data signal, the prediction means produces its next output without an additional external input;
   said internal input means providing a weighted connection form one of said gate means to one of said dendritic compartments in said associated prediction means and also to dendritic compartments in a plurality of other prediction means, said internal input means also provided a non-weighted connection to each of the other dendritic compartments in said associated prediction means;
   said interconnected dendritic compartments in a given prediction means being arranged in a column-like structure with the bottom dendritic compartment in said column being connected to said processing element, and each dendritic compartment is connected to the one below it in the column, each dendritic compartment also including a positive long term memory means, a negative long term memory means and a short term memory means;
   wherein said function used by said processing element to determine its activation value is proportional to the dot product of the difference between the data values in said positive and negative long term memory and the data values in said short term memories in the dendritic compartment.

* * * * *

UNITED STATES PATENT AND TRADEMARK OFFICE
CERTIFICATE OF CORRECTION

PATENT NO.   : 5,255,348
DATED        : October 19, 1993
INVENTOR(S)  : Valeriy I. Nenov It is certified that error appears in the above-indentified patent and that said Letters Patent is hereby corrected as shown below:

Column 1 Line 40 insert a period after --examples--.

Column 1 LIne 49 insert a period after --approach--.

Column 5 Line 21 insert a period after --bits--.

Column 9 Line 13 change "A," to --$A^r(t)$ is--.

Column 9 Line 14 before 'output' add --compared to the threshold $\theta^r$, and if it is larger, then the--.

Column 9 Line 48 change "cf" to --of--.

Column 10 Line 40 change "discussed more" to --discussed in more--.

Column 11 Line 1 insert ":" after --condition)--.

Column 11 Line 14 insert ":" after -- Function --.

Column 11 Line 28 insert ":" after --Input--.

Column 11 Line 39 change " Step 2. Inject STM to $DC^p_i$ " to -- Step 2. Inject STM to $DC^p$s: --.

Column 11 Line 50 change --" $\forall\ i\epsilon(1,P) \wedge j\epsilon(1,D^P)$ such that $\{I_i(t)=1 d_{ij}=1\}$ set $\Delta S_{ij}(t)=\ \forall$ to -- $\forall\ i\ \epsilon(1,p) \wedge j\ \epsilon(1,D^P)$ such that $\{I_i(t) = 1 \wedge d_{ij} = 1\}$ set $\Delta s_{ij}(t)=1$ --

Page 1 of 5

UNITED STATES PATENT AND TRADEMARK OFFICE
CERTIFICATE OF CORRECTION

PATENT NO. : 5,255,348
DATED : October 19, 1993
INVENTOR(S) : Valeriy I. Nenov

It is certified that error appears in the above-indentified patent and that said Letters Patent is hereby corrected as shown below:

Column 11 Line 60 change "$Aj\epsilon(1,D^p)$ such that $\Delta\delta ij(t)=1$ set"

to -- $\forall j\epsilon(1,D^p)$ such that $\Delta S_{i_o}j(t)=1$ set --.

Column 11 Line 61 insert ":" after --DCP--.

Column 12 Line 26 insert ":" after --LTM--.

Column 12 Line 34 change "stage 1" to --<u>stage 1</u>"

Column 12 Line 41 change "wrong -zero- prediction" to --wrong-zero predictron--.

Column 12 Line 46 change "$\forall i\epsilon(1,P) j\epsilon(1,D^p) IF\{(I_i(t) = 1) (O_i(t - 1) = o)\}$"

to -- $\forall i \epsilon(1,P) \wedge j \epsilon(1,D^p) IF \{(I_i(t) = 1) \wedge (O_i(t-1) =O)\}$ --.

Column 12 Line 54 change "IF $s_{ij}(t)=O$ THEN $p_{ij}(t)=p_{ij}(T-1)$"

to -- IF $s_{ij}(t)=O$ THEN $p_{ij}(t) = p_{ij}(t-1)$ --.

Column 12 Line 59 change "$\Delta p^o{}_{ij}(t) = \frac{1}{p_{ij}(t-1)} In (\frac{1}{p_{ij}(t-1)} -1 )$"

to -- $p_{ij}^o(t) = \frac{1}{p_{ij}(t-1)} In (\frac{1}{P_{ij}(t-1)} -1)$ --.

UNITED STATES PATENT AND TRADEMARK OFFICE
CERTIFICATE OF CORRECTION

PATENT NO. : 5,255,348
DATED : October 19, 1993
INVENTOR(S) : Valeriy I. Nenov

It is certified that error appears in the above-indentified patent and that said Letters Patent is hereby corrected as shown below:

Column 12 Line 65 change "$i\epsilon(1,P)$ $j\epsilon(1,D^P)$ $IF\{(I_i(t) = O)$ $(O_i(t-1) = 1)\}$"

to $-- \forall\ i\epsilon(1,P) \wedge j\epsilon(1,D^P)\ IF\{(I_i(t)=O) \wedge (O_i(t-1)=1)\}\ --$.

Column 13 Line 14 insert ":" after --encoding--.

Column 13 Line 27 change "$S_{ij}(t)=S_{ij}-1(t)e^{T_t}$"

to $--S_{ij}(t)=S_{ij\ -\ 1}(t)e^{T_t} --$.

Column 13 Line 30-31 change " The boundary condition is for j=0 set $s_{i0}(t)=0$ or $s_{i0}(t)=s_{iD}p(t)$ "

to -- The boundary condition is: for j = 0 set $s_{i0}(t) = 0$ or $s_{i0}(t) = s_{iD}p(t)$ --.

Column 13 Line 52 change "$IF\ A_i^P(t) \begin{cases} \geq \theta^P\ THEN\ set\ O_i^P(t)=1\ (predictron\ fires) \\ <\theta^P\ THEN\ set\ O_i^P(t)=0\ (predictron\ silent) \end{cases}$"

to $--IF\ A_i^P(t) \begin{cases} \geq \theta^P\ THEN\ set\ O_i^P(t)=1\ (predictron\ fires) \\ < \theta^P\ THEN\ set\ O_i^P(t)=0\ (predictron\ silent) \end{cases} --$.

Column 13 Line 56 insert ":" after --recognitron--.

Column 13 Line 67 change "$\forall i\epsilon(1,R)\ compute\ A_i^P(t)=\sum_{k=1}^{D^r}\ {}^F ExOR(Iext_{i-k}(t+1)O_{j-k}^s(t))$"

to $--\forall i\epsilon(1,R)\ copmute\ \alpha_i^r(t)=\sum_{k=1}^{D^r}\ {}^F ExOR\ (Iext_{i-k}(t+1) \wedge O_{i-k}^P(t))\ --$.

UNITED STATES PATENT AND TRADEMARK OFFICE
CERTIFICATE OF CORRECTION

PATENT NO. : 5,255,348
DATED : October 19, 1993
INVENTOR(S) : Valeriy I. Nenov

It is certified that error appears in the above-indentified patent and that said Letters Patent is hereby corrected as shown below:

Column 14 Line 4 change "IF $A_i^r(t) \begin{cases} \geq \theta^r \text{ THEN set } O_i^r(t)=1 \text{ (recognitron fires)} \\ < \theta^r \text{ THEN set } O_i^r(t)=0 \text{ (recognitron silent)} \end{cases}$"

to --IF $A_i^r(t) \begin{cases} \geq \theta^r \text{ THEN set } O_i^r(t)=1 \text{ (recognitron fires)} \\ < \theta^r \text{ THEN set } O_i^r(t)=0 \text{ (recognitron silent)} \end{cases}$--.

Column 14 Line 8 insert ":" after --input--.

Column 14 Line 20-25 change "IF $O_i^A(t) \begin{cases} = 0 \text{ (correct prediction) THEN set } I(t+1)=Iint_i(t+1) \\ = 1 \text{ (failed prediction) THEN set } I(t+1)=Iext_i(t+1) \end{cases}$ $\forall i \in (1,R)$"

to --$\forall i \in (1,R)$ IF $O_i^r(t) \begin{cases} = 0 \text{ (correct prediction) THEN set } I(t+1)=Iint_i(t+1) \\ = 1 \text{ (failed prediction) THEN set } I(t+1)=Iext_i(t+1) \end{cases}$--.

Column 16 Line 64 change "activating" to --activation--.

Column 17 Line 25 change "means includes" to --means also includes--.

Column 17 Line 44 change "int he" to --in the--.

Column 18 Line 38 change "unit" to --<u>unit</u>--.

Column 18 Line 43 change "unit" to --<u>unit</u>--.

UNITED STATES PATENT AND TRADEMARK OFFICE
CERTIFICATE OF CORRECTION

PATENT NO. : 5,255,348
DATED : October 19, 1993
INVENTOR(S) : Valeriy I. Nenov

It is certified that error appears in the above-indentified patent and that said Letters Patent is hereby corrected as shown below:

Column 20 Line 7 change "form" to --from--.

Column 20 Line 29 change "form" to --from--.

Signed and Sealed this

Twenty-ninth Day of November, 1994

Attest:

BRUCE LEHMAN

*Attesting Officer*  *Commissioner of Patents and Trademarks*